United States Patent [19]

Sumiyoshi

[11] 4,174,690
[45] Nov. 20, 1979

[54] AIR-FUEL RATIO CONTROL DEVICE

[75] Inventor: Masaharu Sumiyoshi, Toyota, Japan

[73] Assignee: Toyota Jidosha Kogyo Kabushiki Kaisha, Toyota, Japan

[21] Appl. No.: 854,678

[22] Filed: Nov. 25, 1977

[30] Foreign Application Priority Data

Sep. 7, 1977 [JP] Japan .................. 52-106752

[51] Int. Cl.² .................. F02M 7/00; F01N 3/10
[52] U.S. Cl. .................. 123/119 EC; 123/119 D; 123/124 B; 60/276; 60/285; 60/290
[58] Field of Search ........ 123/119 D, 119 EC, 124 B, 123/32 EE, 121; 60/276, 285, 289, 290

[56] References Cited

U.S. PATENT DOCUMENTS

| 1,954,968 | 4/1934 | Waters ........................ 123/121 |
| 2,785,966 | 3/1957 | Rockwell .................... 123/121 |
| 3,911,884 | 10/1975 | Moriya et al. ............ 123/32 EE |
| 3,931,710 | 1/1976 | Härtel ........................ 123/119 D |
| 4,010,722 | 3/1977 | Laprade et al. .......... 123/119 EC |
| 4,023,357 | 5/1977 | Masaki ........................ 60/276 |
| 4,062,337 | 12/1977 | Rivere ........................ 123/119 D |
| 4,083,338 | 4/1978 | Bertling et al. .......... 123/119 EC |
| 4,083,341 | 4/1978 | Brettschneider et al. .. 123/119 EC |
| 4,091,783 | 5/1978 | Laprade et al. .......... 123/124 B |

FOREIGN PATENT DOCUMENTS

| 2315004 | 1/1977 | France ........................ 123/119 D |
| 51-146637 | 12/1976 | Japan . |
| 51-149421 | 12/1976 | Japan . |
| 51-24180 | 6/1977 | Japan . |

1438968  6/1976  United Kingdom .............. 123/119 EC

OTHER PUBLICATIONS

S.A.E. Paper No. 750369, Feb. 1975, John Camp, Todd Rachel, "Closed-Loop Electronic Fuel and Air Control of Internal Combustion Engines".
S.A.E. Paper No. 770295, 1977, Grunde T. Engh, Stephen Wallman, "Development of the Volvo Lambda-Sond System".

Primary Examiner—Charles J. Myhre
Assistant Examiner—Andrew M. Dolinar
Attorney, Agent, or Firm—Stevens, Davis, Miller & Mosher

[57] ABSTRACT

Disclosed is an air-fuel ratio controlling device of an internal combustion engine having on its exhaust system a three way catalytic converter. The $O_2$ sensor is disposed in the exhaust system for providing a rich or a lean signal indicating that the total air-fuel ratio is on the rich side or on the lean side of the stoichiometric air-fuel ratio, respectively. A supplementary fuel feed control device having a nozzle flapper mechanism therein is provided for controlling the amount of the supplementary fuel fed into the intake system. This amount of the supplementary fuel is rapidly increased when the total air-fuel ratio is changed from the lean side to the rich side of the stoichiometric air-fuel ratio while the amount of the supplementary fuel is slowly reduced when the total air-fuel ratio is changed from the rich side to the lean side of the stoichiometric air-fuel ratio.

23 Claims, 9 Drawing Figures (a)

(b)

AIR-FUEL RATIO CONTROL DEVICE

DESCRIPTION OF THE INVENTION

The present invention relates to an air-fuel ratio control device for use in an internal combustion engine.

As an exhaust gas purifying device capable of simultaneously reducing the amount of harmful CO, HC and $NO_x$ components in exhaust gas, there has been known an exhaust gas purifying device using a three way catalyzer. The purifying efficiency of the three way catalyzer. The purifying efficiency of the three way catalyzer becomes highest when the total air-fuel ratio (if the intake passage and the exhaust passage located upstream of the inlet of the three way catalytic converter are defined as a gas flow passage, the total air-fuel ratio is defined as the ratio of the amount of air fed into the gas flow passage to the amount of fuel fed into the gas flow passage) becomes equal to the stoichiometric air-fuel ratio. Consequently, in the case wherein the three way catalytic converter is used for purifying exhaust gas, it is necessary to appropriately control the total air-fuel ratio so that it becomes equal to the stoichiometric air-fuel ratio.

As a device for controlling the total air-fuel ratio, there has been known a total air-fuel ratio control device in which a Lambda sensor (λ sensor) is arranged in the exhaust passage located upstream of the three way catalytic converter and, for example, a fuel feed device capable of always forming a lean air-fuel mixture is disposed in the intake passage. In addition, a supplementary fuel feed device is arranged in the intake passage, and the amount of the supplementary fuel is controlled on the basis of the output signal of the λ sensor so that the total air-fuel becomes equal to the stoichiometric air-fuel ratio.

The above-mentioned λ sensor, for example, an oxygen sensor (hereinafter referred to as $O_2$ sensor) produces the output voltage of about 0.9 volt when the total air-fuel ratio is smaller than the stoichiometric air-fuel ratio, and produces the output voltage of about 0.1 volt when the total air-fuel ratio is larger than the stoichiometric air-fuel ratio. Consequently, a total air-fuel ratio control device of this type is provided with an electronic control device for controlling the amount of supplementary fuel fed into the intake system in response to the output signal of the $O_2$ sensor so that the amount of the supplementary fuel is reduced when the total air-fuel ratio is on the rich side of the stoichiometric air-fuel ratio, while the amount of the supplementary fuel is increased when the total air-fuel ratio is on the lean side of the stoichiometric air-fuel ratio.

The above-mentioned electronic control device usually includes an integration circuit and produces an output voltage which is increased at a constant rate when the $O_2$ sensor produces the lean signal indicating that the total air-fuel ratio is on the lean side of the stoichiometric air-fuel ratio, so that the amount of the supplementary fuel fed into the intake system is increased at a constant rate in response to the output signal of the $O_2$ sensor. On the other hand, the electronic control device produces the output voltage which is reduced at the same constant rate as in the case wherein the output voltage is increased when the $O_2$ sensor produces the rich signal indicating that the total air-fuel ratio is on the rich side of the stoichiometric air-fuel ratio, so that the amount of the supplementary fuel fed into the intake system is reduced at a constant rate.

However, actually, there is a time lag in the responsiveness of the $O_2$ sensor. For example, as is disclosed in the Japanese Pat. No. 52-24180, the time lag in the generation of the lean signal produced in the $O_2$ sensor when the total air-fuel ratio is changed to the lean side from the rich side of the stoichiometric air-fuel ratio is longer than that in the generation of the rich signal when the total air-fuel ratio is changed to the rich side from the lean side.

FIG. 5 (a) shows a conventional method of controlling the feeding operation of supplementary fuel by using the above-mentioned electronic control device. In FIG. 5, the ordinate Q indicates the amount of the supplementary fuel fed into the intake system and the abscissa T indicates time. In addition, in FIG. 5, the solid line P indicates the amount of the supplementary fuel which is necessary to make the total air-fuel ratio equal to the stoichiometric air-fuel ratio, and the solid line R indicates the amount of the supplementary fuel which is actually fed into the intake system. Furthermore, in FIG. 5, the point A indicates the moment when the $O_2$ sensor produces the rich signal, and the point B indicates the moment when the $O_2$ sensor produces the lean signal. From FIG. 5, it is understood that the time lag $t_b$ in the generation of the lean signal is longer than the time lag $t_a$ in the generation of the rich signal. As a result of this, since the amount of the supplementary fuel actually fed into the intake passage is less than the amount of the supplementary fuel which is necessary to make the mean value of the total air-fuel ratio equal to the stoichiometric air-fuel ratio, the actual mean value of the total air-fuel ratio is in the leaner side of the stoichiometric air-fuel ratio. Therefore, there occurs a problem in that a satisfactory purifying efficiency cannot be obtained in the case wherein the above-mentioned electronic control device is used.

In order to eliminate the above described problem, there has been proposed an electronic control device capable of controlling the amount of the supplementary fuel fed into the intake system so that the amount of the supplementary fuel is rapidly increased at a constant high rate, while the amount of the supplementary fuel is slowly reduced at a constant low rate. Such an electronic control device is disclosed in SAE Paper No. 750369. It is true that, since the mean value of the total air-fuel ratio becomes equal to the stoichiometric air-fuel ratio in the case wherein the above electronic control device is used, the purifying efficiency can be improved.

In addition, another electronic control device is disclosed in Japanese Patent Laid Open Publication No. 51-149421. In this device, the supplementary fuel fed into the intake system is instantaneously increased or reduced by a predetermined amount when the detecting signal of the $O_2$ sensor is changed to the lean signal from the rich signal or is changed to the rich signal from the lean signal, thereby improving the responsiveness of the control operation. In addition, in this device, the amount of the supplementary fuel (skip amount) which is instantaneously increased is set so as to be different from that of the supplementary fuel which is instantaneously reduced, so that the difference in the mean values between the total air-fuel ratio and the stoichiometric air-fuel ratio, which difference is caused based on the difference in the time lag between the lean and the rich signals porduced in the O₂ sensor, is compensated for.

In the case wherein the supplementary fuel feed control is carried out by using an electronic control device as mentioned above, the manufacturing cost of the total air-fuel ratio control device is increased and, thus, the adoption of such an electronic control device can not be considered as a practical method for controlling the feeding operation of the supplementary fuel.

An object of the present invention is to provide a total air-fuel ratio control device capable of making the mean value of the total air-fuel ratio precisely equal to the stoichiometric air-fuel ratio in such a manner that the amount of the supplementary fuel fed into the intake system is rapidly increased and slowly reduced by using a simple mechanism without adopting an electronic control device of a complicated construction.

According to the present invention, there is provided an air-fuel ratio controlling device of an internal combustion engine having a gas flow passage consisting of an intake passage and an exhaust passage, said device comprising: a λ sensor disposed in the exhaust passage for providing a rich signal indicating that the total air-fuel ratio is on the rich side of the stoichiometric air-fuel ratio and a lean signal indicating that the total air-fuel ratio is on the lean side of the stoichiometric air-fuel ratio; valve means having a valve for controlling the amount of supplementary fluid fed into the gas flow passage, and; valve actuating means for mechanically changing the opening speed and the closing speed of said valve in response to said rich and said lean signals so that said opening and closing speed is rapidly and gradually changed in the first half of the opening and closing operation of said valve, while said opening and closing speed is slowly and gradually changed in the latter half of said opening and closing operation so as to make the mean value of the total air-fuel ratio precisely equal to a predetermined air-fuel ratio.

The present invention may be more fully understood from the description of preferred embodiments of the invention set forth below, together with the accompanying drawings.

DESCRIPTION OF PREFERRED EMBODIMENTS

Figure 1:
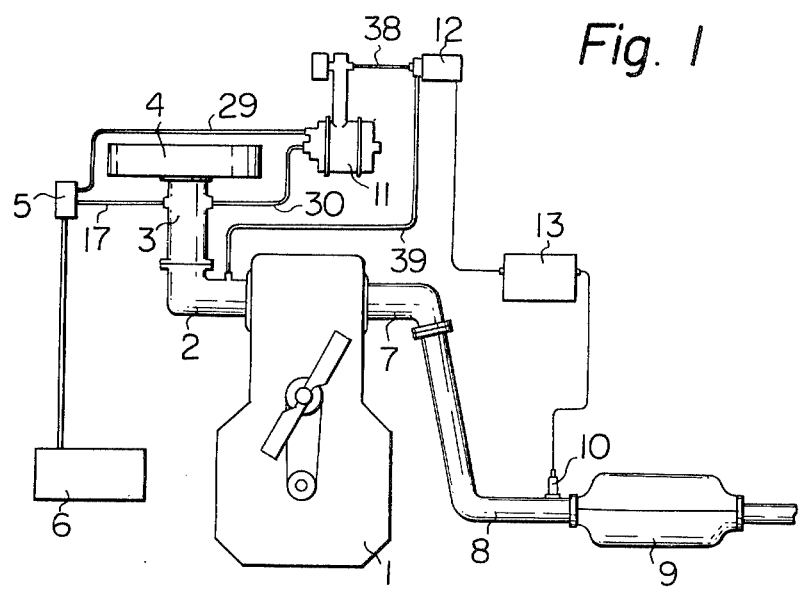
FIG. 1 is a general view of an embodiment of an internal combustion engine according to the present invention.
Figure 2:
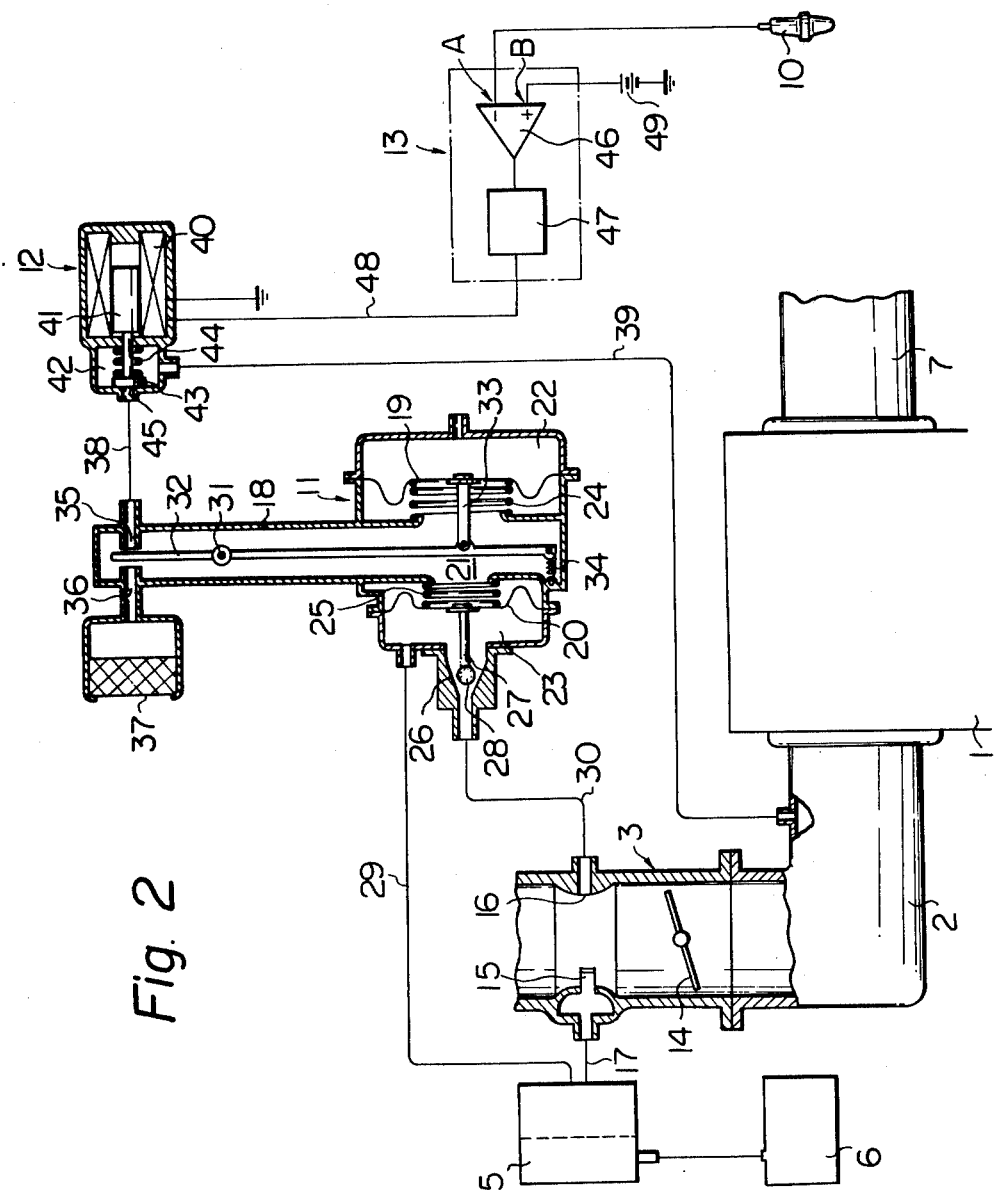
FIG. 2 is an enlarged view, partially in cross-section, of an engine shown in FIG. 1.

Referring to FIG. 1, 1 designates an engine body, 2 an intake manifold, 3 a carburetor for liquefied petroleum gas (hereinafter referred to as LPG) and 4 an air cleaner; 5 designates a regulator for LPG, 6 a LPG tank, 7 an exhaust manifold and 8 an exhaust pipe; 9 designates a three way catalytic converter, 10 an O₂ sensor, 11 a supplementary fuel feed control device and 12 an electromagnetic valve, and; 13 designates an electronic control circuit for actuating the electromagnetic valve 12 on the basis of the output signal of the O₂ sensor 10. FIG. 2 shows an enlarged view of a part of the total air-fuel ratio control device shown in FIG. 1. Referring to FIG. 2, a throttle valve 14 is disposed in the carburetor 3, and a main fuel feed port 15 and a supplementary fuel feed port 16 open into the inside of the carburetor 3 at a position located upstream of the throttle valve 14. The main fuel feed port 15 is connected, via a fuel conduit 17, to the LPG regulator 5 which is set so as to be able to always form a lean air-fuel mixture in the carburetor 3. On the other hand, the supplementary fuel feed control device 11 has in its housing 18 a pair of diaphragms 19 and 20, and the inside of the housing 18 is divided into a vacuum chamber 21, an atmospheric pressure chamber 22 and a LPG chamber 23 by means of the diaphragms 19 and 20. The diaphragm 19 is always urged towards the right in FIG. 2 due to the spring force of a compression spring 24 and, on the other hand, the diaphragm 20 is always urged towards the left in FIG. 2 due to the spring force of a compression spring 25. A diverging nozzle 26 which gradually expands towards the diaphragm 20 is formed on the housing 18 at a position facing the diaphragm 20. The opening area of the diverging nozzle 26 is controlled by a valve head 28 which is connected to the diaphragm 20 by means of a stem 27. The LPG chamber 23 is connected to the LPG regulator 5 via a fuel conduit 29, on one hand, and to the supplementary fuel feed port 16 via the diverging nozzle 26 and a fuel conduit 30, on the other hand. In addition, a flapper 32 which is pivotally mounted on the housing 18 by means of a pivot 31 is arranged in the vacuum chamber 21, and the lower portion of the flapper 32 is pivotally mounted on the tip of a rod 33 fixed onto the diaphragm 19. Furthermore, an adjust tension spring 34 is arranged between the lower end of the flapper 32 and the housing 18. A vacuum port 35 and an air port 36 are disposed in the inside of the upper end of the housing 18 so that the vacuum port 35 faces the air port 36. The upper end of the flapper 32 is positioned between the vacuum port 35 and the air port 36 so that the flapper 32, the vacuum port 35 and the air port 36 form a nozzle flapper mechanism. The air port 36 is connected to the atmosphere via an air filter 37 and the vacuum port 35 is connected to the inside of the intake manifold 2, which functions as a vacuum source of the engine, via a vacuum conduit 38, the electro-magnetic valve 12 and a vacuum conduit 39.

The electromagnetic valve 12 has in its housing a solenoid 40, a movable plunger 41, a valve chamber 42 and a valve head 43 connected to the movable plunger 41. The valve head 43 normally closes a vacuum port 45 due to the spring force of a compression spring 44. The valve chamber 42 is always connected to the inside of the intake manifold 2 via the vacuum conduit 39.

The electronic control circuit 13 comprises a comparator 46 and an amplifier 47 which is connected to the output side of the comparator 46. The output side of the amplifier 47 is connected to the solenoid 40 via a lead wire 48. One of the inputs A of the comparator 46 is connected to the O₂ sensor 10, while the other input B of the comparator 46 is connected to a reference voltage source 49. As mentioned previously, the O₂ sensor 10 produces an output voltage of about 0.9 volt when the total air-fuel ratio is on the rich side of the stoichiometric air-fuel ratio, while the O₂ sensor 10 produces an output voltage of about 0.1 volt when the total air-fuel ratio is on the lean side of the stoichiometric air-fuel ratio. On the other hand, the comparator 46 produces an output voltage of a high level when the O₂ sensor 10 produces the output of about 0.1 volt, while the comparator 46 produces an output voltage of a low level when the O₂ sensor 10 produces the output voltage of about 0.9 volt. In addition, when the comparator 46 produces the output voltage of a high level, the solenoid 40 is energized. Consequently, since the solenoid 40 is energized when the total air-fuel ratio is on the lean side of the stoichiometric air-fuel ratio, the valve head 43 opens the vacuum port 45 and, as a result, the vacuum port 35 is connected to the inside of the intake manifold 2.

Figure 6:
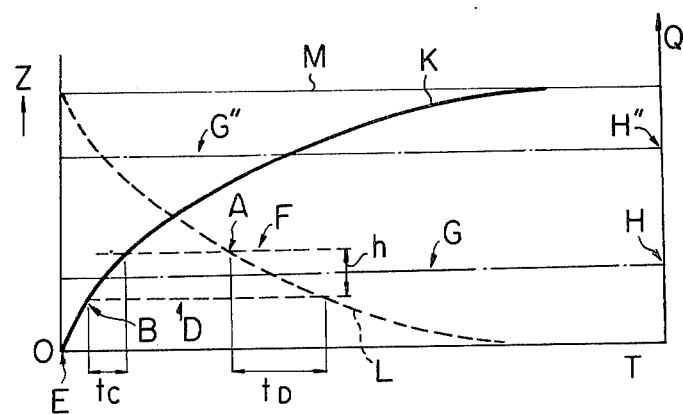
FIG. 6 is a graph showing the change in the amount of the supplementary fuel fed into the intake system in an engine according to the present invention.

The operation of the supplementary fuel feed control device 11 will be hereinafter described with reference to FIGS. 2 and 6. In FIG. 6, the ordinate Z indicates the vacuum level in the vacuum chamber 21, and the abscissa T indicates time.

In the supplementary fuel feed control device 11 shown in FIG. 2, the position of the diaphragm 20, that is, the position of the valve head 28 is determined by the vacuum level in the vacuum chamber 21. Since the valve head 28 moves towards the right in FIG. 2 when the vacuum level in the vacuum chamber 21 is increased, the opening area of the diverging nozzle 26, which is formed between the conical inner wall of the diverging nozzle 26 and the valve head 28, is gradually increased as the vacuum level in the vacuum chamber 21 is increased. Consequently, the amount of supplementary fuel flowing towards the supplementary fuel feed port 16 from the LPG chamber 23 via the diverging nozzle 26 is increased as the vacuum level in the vacuum chamber 21 is increased.

The vacuum level in the vacuum chamber 21 varies as follows in response to the opening action of the electromagnetic valve 12. Assuming that a long time has passed under the state wherein the solenoid 40 remains de-energized and, thus, the vacuum port 45 remains closed by the valve head 43 due to the spring force of the compression spring 44, the pressure in the vacuum chamber 21 is equal to atmospheric pressure. This state is indicated by the point E in FIG. 6. When the solenoid 40 is energized and, thus, the vacuum port 35 is connected to the inside of the intake manifold 2, the air in the vacuum chamber 21 is sucked into the intake manifold 2 and, as a result, the vacuum level in the vacuum chamber 21 is increased as time passes, as shown by the solid line K in FIG. 6. At the initial stage of the increase in the vacuum level in the vacuum chamber 21, since the diaphragm 19 is biased towards the right in FIG. 2 due to the spring force of the compression spring 24, the air port 36 is closed by the flapper 32 and, on the other hand, the vacuum port 35 is fully opened. As a result of this, since the air in the vacuum chamber 21 is rapidly sucked into the intake manifold 2 via the vacuum port 35, the vacuum level in the vacuum chamber 21 is rapidly increased. After this, when the vacuum level in the vacuum chamber 21 is increased to a certain extent, the diaphragm 19 starts the movement towards the left in FIG. 2 against the spring force of the compression spring 24. As a result of this, the flapper 32 gradually opens the air port 36, on one hand, and gradually closes the vacuum port 35, on the other hand. As a result, since the amount of the inflow of air into the vacuum chamber 21 via the air port 36 is gradually increased and, at the same time, the amount of the outflow of air from the vacuum chamber 21 via the vacuum port 35 is gradually reduced, the speed of increase in the vacuum level in the vacuum chamber 21 is gradually reduced. Then, the vacuum level in the vacuum chamber 21 converges to a constant level shown by the straight line M in FIG. 6 when the amount of the inflow of air into the vacuum chamber 21 becomes equal to the amount of the outflow of air from the vacuum chamber 21. Consequently, the change in vacuum level in the vacuum chamber 21 will be as shown by the solid line K in FIG. 6. The above-mentioned constant vacuum level M is determined by the spring constant of the compression spring 24 and the surface area of the diaphragm 19 and, in addition, the constant vacuum level M settles at a predetermined level independent of the vacuum level in the intake manifold 2 so long as the vacuum level in the intake manifold 2 is larger than said predetermined level. The constant vacuum level M can be set at a given level within the range of $-50$ through $-80$ mmHg and, in this embodiment, the constant vacuum level M is set at $-50$ mmHg. That is, in this embodiment, the spring constant of the compression spring 24 is so set that, when the vacuum level in the vacuum chamber 21 becomes equal to $-50$ mmHg, the amount of the inflow of air into the vacuum chamber 21 becomes equal to that of the outflow of air from the vacuum chamber 21.

Secondly, assuming that a long time has been passed under the state wherein the solenoid 40 remains energized, the vacuum level in the vacuum chamber 21 is equal to the constant vacuum level M as mentioned above. In this state, when the solenoid 40 is de-energized and the vacuum port 45 is closed by the valve head 43, air is sucked into the vacuum chamber 21 via the air port 36 and, as a result, the vacuum level in the vacuum chamber 21 is reduced. At the initial stage of reduction in the vacuum level in the vacuum chamber 21, since the flapper 32 fully opens the air port 36, a large amount of air is sucked into the vacuum chamber 21 via the air port 36 and, as a result, the vacuum level in the vacuum chamber 21 is rapidly reduced. Then, the flapper 32 gradually closes the air port 36 as the vacuum level in the vacuum chamber 21 is reduced. As a result of this, the amount of air sucked into the vacuum chamber 21 is gradually reduced and, thus, the speed of reduction in the vacuum level in the vacuum chamber 21 is gradually reduced. Consequently, the change in the vacuum level in the vacuum chamber 2 will be as shown by the broken line L in FIG. 6.

On the other hand, the supplementary fuel feed control device 11 is so constructed that the amount of the fuel fed into the carburetor 3 via the diverging nozzle 26 is increased approximately in proportion to the increase in the vacuum level in the vacuum chamber 21 and, consequently, the curved lines K and L shown in FIG. 6 also indicate the change in amount Q of the supplementary fuel fed into the carburetor 3. In the embodiment shown in FIG. 2, the LPG carburetor 3 is so set that, when the supplementary fuel, the amount Q of which corresponds to an amount shown by the point H in FIG. 6, is fed into the carburetor 3, that is, when the vacuum level in the vacuum chamber 21 is equal to a vacuum level Z shown by the straight line G in FIG. 6, the total air-fuel ratio becomes equal to the stoichiometric air-fuel ratio. As will be apparent from FIG. 6, this vacuum level Z shown by the line G is set at a level which is less than half of the constant vacuum level M.

When the engine is operating, since the opening operation of the electromagnetic valve 12 is repeated at extremely short intervals, the vacuum level in the vacuum chamber 21 does not become equal to the constant vacuum level M and the atmospheric pressure. That is, in FIG. 6, when the vacuum level in the vacuum chamber 21 is reduced and becomes equal to the vacuum level shown by the broken line D, the increasing operation of the amount of the supplementary fuel fed into the carburetor is started, and; on the other hand, when the vacuum level in the vacuum chamber 21 is increased and becomes equal to the vacuum level shown by the broken line F, the above-mentioned increasing operation is stopped and, at the same time, the reducing operation of the amount of the supplementary fuel is started. Consequently, from FIG. 6, it will be understood that the length of time $t_C$ which is necessary to increasing the supplementary fuel by an amount shown by h in FIG. 6 is shorter than the amount of time $t_D$ which is necessary to reduce the supplementary fuel by the amount h.

Figure 7:
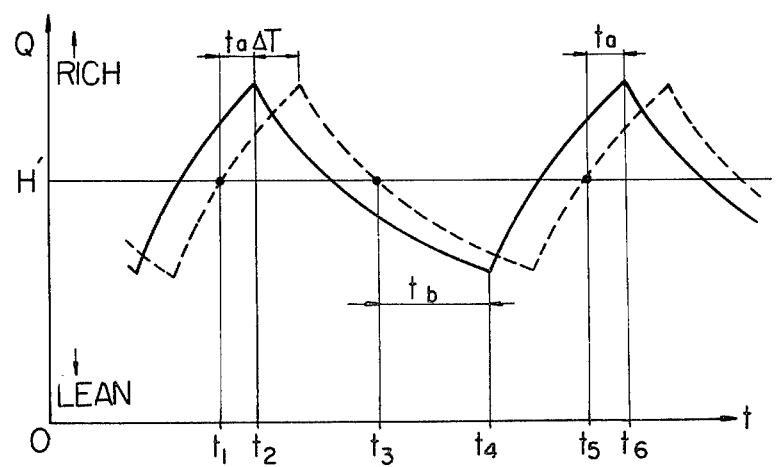
FIG. 7 is a graph showing the change in the total air-fuel ratio.

FIG. 7 shows the changes in the total air-fuel ratio in the case wherein the total air-fuel ratio is controlled by using the total air-fuel ratio control device according to the present invention. In FIG. 7, the abscissa t indicates time, and the ordinate Q indicates the amount of the supplementary fuel, that is, the reciprocal number of an air-fuel ratio. In addition, in FIG. 7, H' indicates the amount of supplementary fuel which is necessary to make the total air-fuel ratio equal to the stoichiometric air-fuel ratio. While the above-mentioned amount H' of the supplementary fuel is changed and caused to be slightly different from the setting amount shown by H in FIG. 6 in accordance with changes in ambient temperature and atmospheric pressure, it can be considered that the amount H' is approximately equal to the setting amount H. In addition, in FIG. 7, the curved solid line indicates the amount of supplementary fuel or the air-fuel ratio of the air-fuel mixture formed in the carburetor 3, and the curved broken line indicates the total air-fuel ratio detected by the $O_2$ sensor 10 in the exhaust passage. As is shown in FIG. 7, since a certain length of time $\Delta T$ passes until the air-fuel mixture formed in the carburetor 3 is burned in the cylinder and the exhaust gas of said air-fuel mixture reaches a position around the $O_2$ sensor 10, the total air-fuel ratio measured by the $O_2$ sensor 10 is changed with a delay time $\Delta T$ relative to change in the air-fuel ratio in the carburetor 3. While this delay time $\Delta T$ is shortened as the level of load of the engine and the engine speed are increased, the delay time $\Delta T$ is maintained at a constant length when the engine is operating under a constant load at a constant speed. Assuming that the delay time $\Delta T$ is constant, if the total air-fuel ratio is changed from the lean side to the rich side of the stoichiometric air fuel ratio at the time $t_1$, this change is detected by the $O_2$ sensor 10 at the time $t_2$ after the time lag $t_a$ passes, which the $O_2$ sensor 10 inherently possesses, and then, the $O_2$ sensor 10 produces the output voltage of a high level (about 0.9 volt), that is, the rich signal. As a result of this, since the solenoid 40 is de-energized, the vacuum level in the vacuum chamber 21 is reduced as depicted by the curved broken line L (FIG. 6) from the point A shown in FIG. 6 and, accordingly, the amount of supplementary fuel fed into the intake passage is reduced. At this time, since the speed of reduction in the amount of the supplementary fuel fed into the intake passage is low, as mentioned above, the air-fuel ratio of the air-fuel mixture formed in the carburetor 3 is gradually increased (That is, the mixture becomes lean). Then, the total air-fuel ratio in the exhaust system of the engine is gradually increased with a delay time $\Delta T$ relative to change in the air-fuel ratio in the intake system. After a while, when the total air-fuel ratio is changed from the rich side to the lean side of the stoichiometric air-fuel ratio at the time $t_3$ in FIG. 7, this change is detected by the $O_2$ sensor 10 at the time $t_4$ after the time lag $t_b$ passes, which the $O_2$ sensor 10 inherently possesses, and then, the $O_2$ sensor 10 produces the lean signal. As a result of this, since the solenoid 40 is energized, the vacuum level in the vacuum chamber 21 is increased as depicted by the curved solid line K (FIG. 6) from the point B shown in FIG. 6 and, accordingly, the amount of supplementary fuel fed into the carburetor 3 is increased. At this time, since the speed of increase in the amount of the supplementary fuel fed into the carburetor 3 is high, as mentioned previously, the air-fuel ratio of the air-fuel mixture formed in the carburetor 3 is rapidly reduced (That is, the mixture becomes rich) and, thus, is rapidly changed from the lean side to the rich side of the stoichiometric air-fuel ratio. After this, when the total air-fuel ratio in the exhaust system is changed from the lean side to the rich side at the time $t_5$, this change is detected by the $O_2$ sensor 10 at the time $t_6$, after the time lag $t_a$ passes, in the same manner as in the preceeding cycle. After this, the cycle is repeated.

In this embodiment, it is possible to make the mean value of the total air-fuel ratio precisely equal to a predetermined air-fuel ratio. That is, since the speed of increase and reduction in the amount of the supplementary fuel fed into the carburetor 3 is so controlled that the speed of increase is high and the speed of reduction is low, as is shown in FIG. 6, even if the length of the time lag $t_a$ in generation of the rich signal is different from that of the time lag $t_b$ in generation of the lean signal, it is possible to make the mean value of the total air-fuel ratio precisely equal to the stoichiometric air-fuel ratio. In addition, in the $O_2$ sensor 10 shown in FIG. 2, the time lag $t_a$ is shorter than the time lag $t_b$. However, there is a λ sensor in which the time lag $t_a$ is longer than the time lag $t_b$. In the case wherein such a λ sensor is adopted, it is also possible to make the mean value of the total air-fuel ratio precisely equal to the stoichiometric air-fuel ratio by setting the supplementary fuel feed control device 11 so that the air-fuel ratio of the air-fuel mixture formed in the carburetor 3 becomes equal to the stoichiometric air-fuel ratio when the amount of the supplementary fuel fed into the carburetor 3 is equal to an amount Q shown by the point H" in FIG. 6, that is, the vacuum level in the vacuum chamber 21 is equal to a vacuum level Z shown by the straight line G" in FIG. 6.

Figure 3:
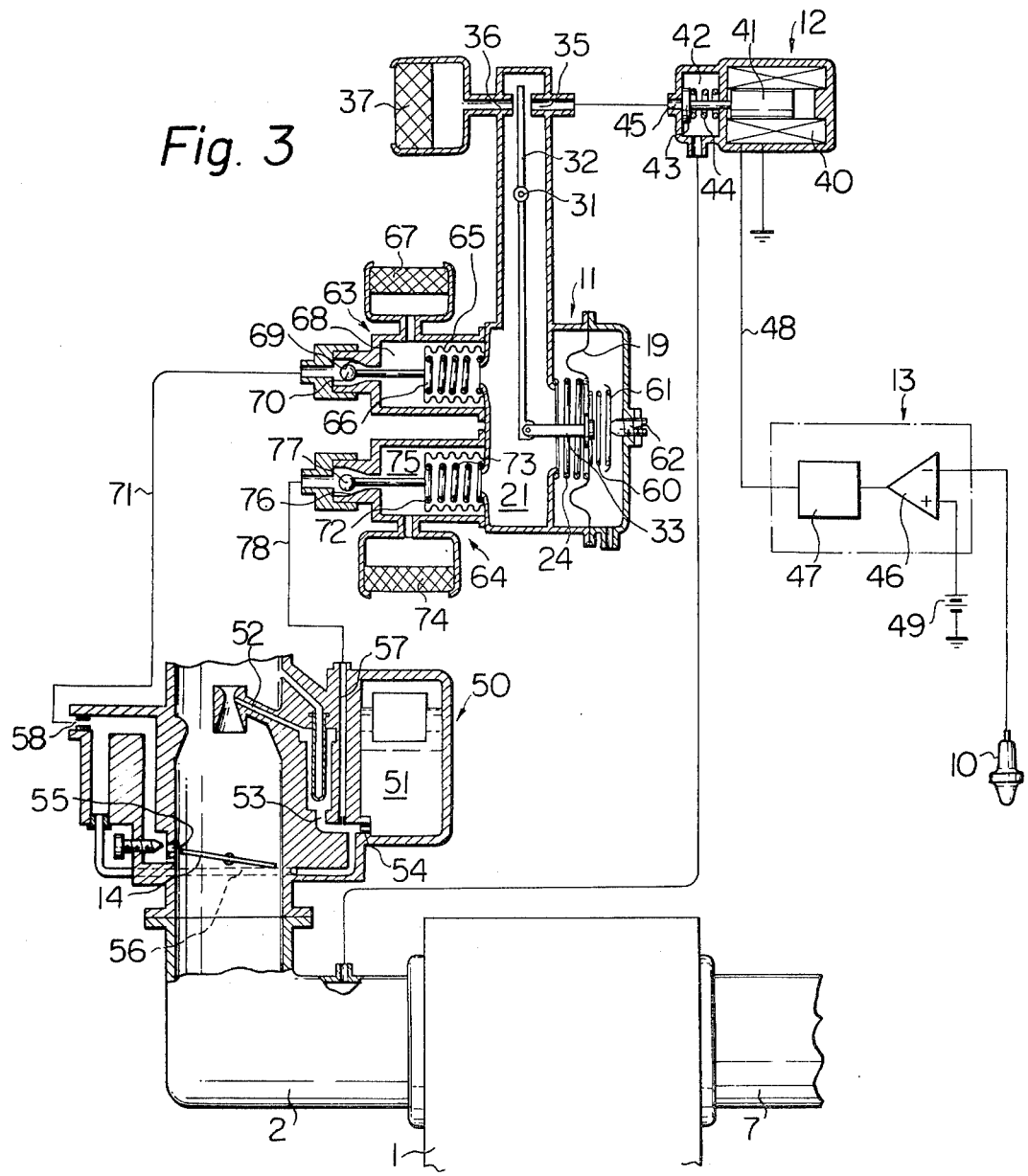
FIG. 3 is an enlarged view, partially in cross-section, of another embodiment of the engine shown in FIG. 1.
Figure 5:
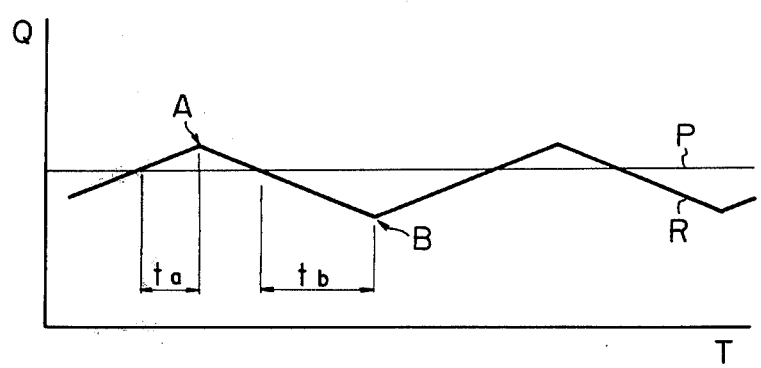
FIG. 5 is a graph showing the change in the amount of the supplementary fuel fed into the intake system of an engine in a conventional device.
Figure 5:
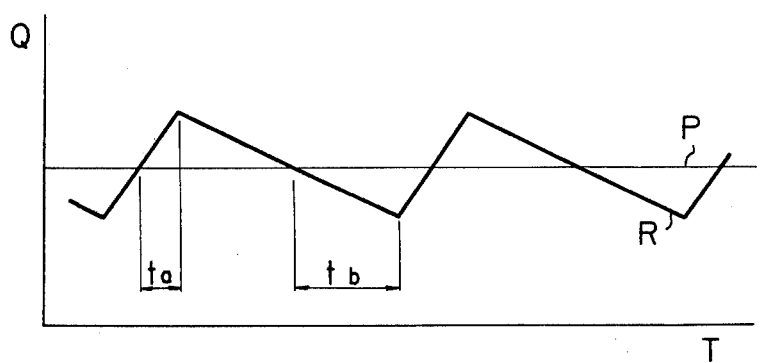

FIG. 3 shows the case wherein the present invention is applied to a gasoline engine with a carburetor. In FIG. 3, similar components to those in FIG. 2 are indicated by the same reference numerals as used in FIG. 2. In FIG. 3, a carburetor generally designated by reference numeral 50 comprises: a float chamber 51; a main nozzle 52; a fuel passage 53 communicating the float chamber 51 with the main nozzle 52; a main jet 54 disposed in the fuel passage 53; a slow fuel port 55 opening into the inside of the carburetor 50 at a position located upstream of the throttle valve 14 when the throttle valve 14 is in the idling position; a slow fuel passage 56 communicating the slow fuel port 55 with the fuel passage 53; an air bleed passage 57 connected to the main nozzle 52, and; an air bleed passage 58 connected to the slow fuel port 55.

As is shown in FIG. 3, a bleed air control device 11' used for controlling the amount of the fuel fed into the intake passage is provided with a spring adjust mechanism comprising a compression spring 60, a spring retainer 61 and an adjust screw 62, instead of adopting an adjust tension spring 34 shown in FIG. 2. In addition, the bleed air control device 11' further comprises a pair of bellows apparatuses 63 and 64. The bellows device 63 comprises a bellows 65, a compression spring 66, for always biasing the bellows 65 towards the left in FIG. 3, an atmospheric pressure chamber 68 connected to the atmosphere via an air filter 67, a diverging nozzle 69 expanding towards the outside of the device 11', and a valve head 70 connected to the bellows 65 and controlling the opening area of the diverging nozzle 69. The atmospheric pressure chamber 68 is connected to the air bleed passage 58 via the diverging nozzle 69 and an air conduit 71. On the other hand, the bellows apparatus 64 comprises a bellows 72, a compression spring 73, for always biasing the bellows 72 towards the left in FIG. 3, an atomospheric pressure chamber 75 connected to the atmosphere via an air filter 74, a diverging nozzle 76 expanding towards the outside of the device 11', and a valve head 77 connected to the bellows 72 and controlling the opening area of the diverging nozzle 76. The atmospheric pressure chamber 75 is connected to the air bleed passage 57 via the diverging nozzle 76 and an air conduit 78.

As is described with reference to the embodiment shown in FIG. 2, when the O₂ sensor 10 produces a lean signal, the solenoid 40 is energized and, as a result, the vacuum level in the vacuum chamber 21 is rapidly increased. Consequently, the bellows 65 and 72 move towards the right in FIG. 3 against the spring force of the compression springs 66 and 73, respectively. As a result of this, since the opening area formed between the valve head 70 and the conical inner wall of the diverging nozzle 69, and the opening area formed between the valve head 77 and the conical innner wall of the diverging nozzle 76, are rapidly reduced, the amount of air bleeding into the air bleed passage 57 or 58 is accordingly reduced. Therefore, since the amount of air contained in the fuel induced from the main nozzle 52 or the slow fuel port 55 is reduced, the flow rate of the fuel induced from the main nozzle 52 or the slow fuel port 55 is rapidly increased. As a result of this, an air-fuel ratio of an air-fuel mixture formed in the carburetor 50 is rapidly reduced and changed from the lean side to the rich side of the stoichiometric air-fuel ratio.

On the other hand, when the O₂ sensor 10 produces a rich signal, the solenoid 40 is de-energized and, as a result, the vacuum level in the vacuum chamber 21 is gradually reduced as mentioned previously. Consequently, the bellows 65 and 72 gradually move towards the left in FIG. 3, the opening area formed between the valve head 70 and the conical inner wall of the diverging nozzle 69, and the opening area formed between the valve head 77 and the conical inner wall of the diverging nozzle 76, are gradually increased. Therefore, since the amount of the bleeding air is gradually increased, the flow rate of the fuel induced from the main nozzle 52 or the slow fuel port 55 is gradually reduced. As a result of this, the air-fuel ratio of the air-fuel mixture formed in the carburetor 50 is gradually increased and gradually changed from the rich side to the lean side of the stoichiometric air-fuel ratio. Consequently, the total air-fuel ratio is changed in the manner as depicted in FIG. 7. As is known to those skilled in the art, in the carburetor 50, the fuel is fed from the main nozzle 52 when the amount of the air introduced into the cylinder of the engine is large, while the fuel is fed from the slow fuel port 55 when the amount of the air introduced into the cylinder is small. Consequently, the control of the feeding operation of the fuel is carried out by controlling the amount of the bleeding air in such a manner that the amount of the air bleeding into the air bleed passage 57 is controlled when the amount of the air introduced into the cylinder is large, while the amount of the air bleeding into the air bleed passage 58 is controlled when the amount of the air introduced into the cylinder is small.

Figure 4:
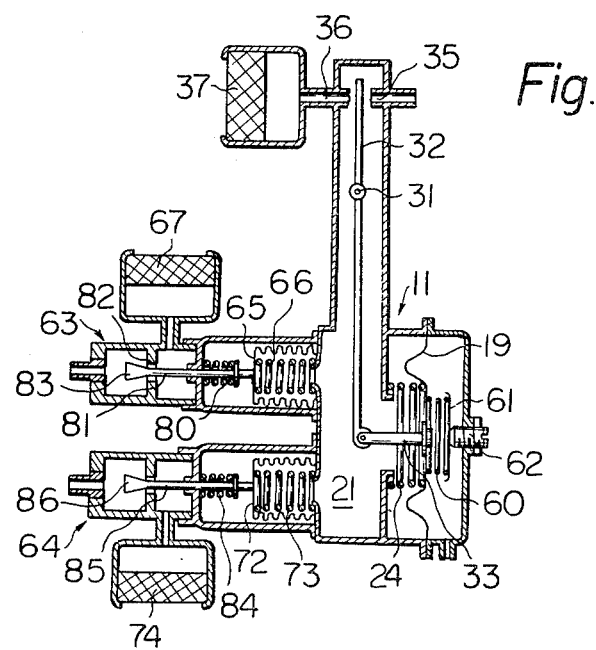
FIG. 4 is a cross-sectional view of another embodiment of the supplementary fuel feed control device shown in FIG. 3.

FIG. 4 shows an alternative embodiment of the air bleed control device shown in FIG. 3. Referring to FIG. 4, the bellows apparatus 63 is provided with a movable rod 81 which always abuts against the bellows 65 due to the spring force of a compression spring 80. The movable rod 81 has on its left end a valve head 83 having a cross-sectional area which is gradually increased towards the left in FIG. 4 for controlling the opening area of an opening 82. On the other hand, the bellows apparatus 64 is provided with a movable rod 85 which always abuts against the bellows 72 due to the spring force of a compression spring 84. The movable rod 85 has on its left end (in FIG. 4) a valve head 86 having the same shape as the valve head 83. In this embodiment, similar to the embodiment shown in FIG. 3, the amount of the bleeding air is increased when the bellows 65 and 72 move towards the left in FIG. 4, while the amount of the bleeding air is reduced when the bellows 65 and 72 move towards the right in FIG. 4.

Figure 8:
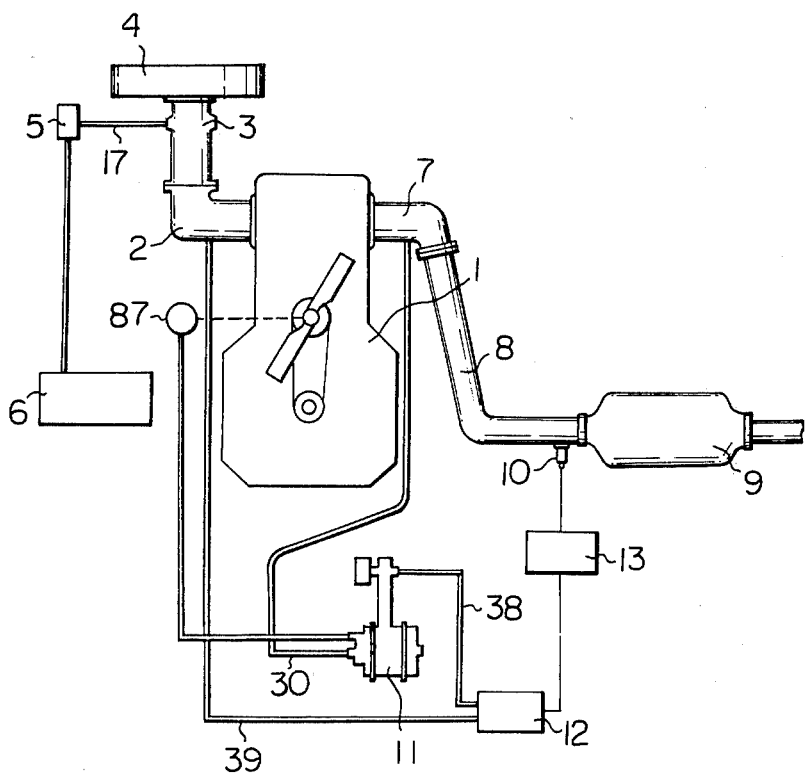
FIG. 8 is a general view of a further embodiment of an engine according to the present invention.
Figure 9:
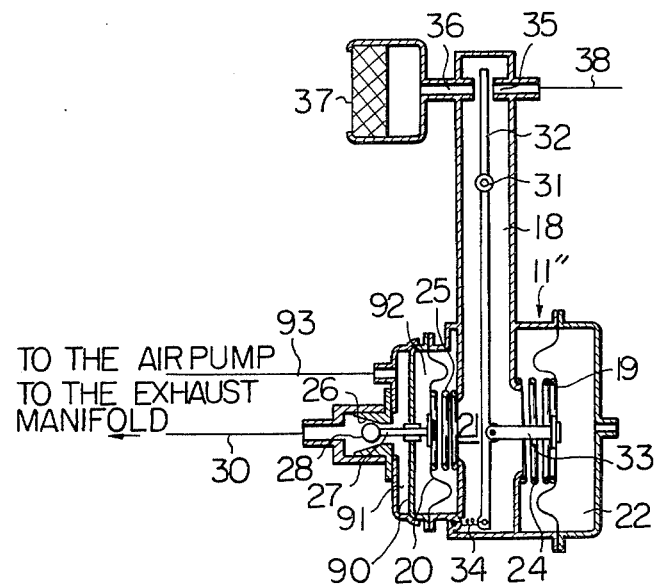
FIG. 9 is an enlarged cross-sectional view of a supplementary air feed control device shown in FIG. 8.

In the embodiments hereinbefore described, the total air-fuel ratio is controlled by regulating the amount of fuel fed into the intake system of the engine. However, the present invention can be applied to a secondary air feed control device in which a rich air-fuel mixture is fed into the cylinder of the engine and, in addition, the amount of a secondary air fed into the exhaust system of the engine is so controlled that the total air-fuel ratio becomes equal to a predetermined air-fuel ratio, that is, the stoichiometric air-fuel ratio. In this case, as shown in FIGS. 8 and 9, a supplementary air feed control device 11" has such a construction that a partition 90 is disposed in the LPG chamber 23 of the supplementary fuel feed control device 11 shown in FIG. 2. Consequently, the partition 90 forms two separated chambers consisting of an air chamber 91 and an atmospheric pressure chamber 92. The air chamber 91 is connected to a secondary air source, that is, an air pump 87 driven by the engine, via a secondary air conduit 93, on one hand, and to the exhaust manifold 7 via the conduit 30, on the other hand. In addition, as is shown in FIG. 9, the diverging nozzle 26 is formed so as to expand towards the outside of the device 11". Furthermore, the partition 90 serves to prevent the delivery pressure of the air pump 87 from acting on the diaphragm 20.

According to the present invention, since it is possible to make the mean value of the total air-fuel ratio precisely equal to a predetermined air-fuel ratio, that is, the stoichiometric air-fuel ratio, the purifying efficiency of the exhaust gas in an exhaust gas purifier is greatly improved and, thus, the amount of harmful components in the exhaust gas discharged into the atmosphere can be greatly reduced. In addition, in the present invention, since it is possible to mechanically make the mean value of the total air-fuel ratio precisely equal to the stoichiometric air-fuel ratio by using a simple nozzle flapper mechanism, the manufacturing cost is considerably reduced as compared with a conventional device of an electronic control type and the reliable operation of a total air-fuel ratio control device can be maintained for a long time.

Furthermore, as is shown in FIG. 7, in a total air-fuel ratio control device according to the present invention, the amount of the supplementary fuel fed into the intake system of the engine is rapidly changed immediately after the output signal of the $O_2$ sensor is changed from the lean signal to the rich signal or from the rich signal to the lean signal and, after this, the amount of the supplementary fuel fed into the intake system is gradually reduced or increased. Such a change of speed in the amount of the supplementary fuel fed into the intake system is the same as that in an electronic control device disclosed in Japanese Patent Laid Open Publication No. 51-146637. Consequently, a total air-fuel ratio control device according to the present invention has a good control responsiveness.

While the invention has been described by reference to specific embodiments chosen for purposes of illustration, it should be apparent that numerous modifications could be made thereto by those skilled in the art without departing from the spirit and scope of the invention.

What is claimed is:

1. An air-fuel ratio controlling device of an internal combustion engine having a gas flow passage comprising an intake passage and an exhaust passage, said device comprising:
   a $\lambda$ sensor disposed in the exhaust passage for providing a rich signal indicating that the total air-fuel ratio is on the rich side of the stoichiometric air-fuel ratio and a lean signal indicating that the total air-fuel ratio is on the lean side of the stoichiometric air-fuel ratio;
   valve means having a valve for controlling the amount of supplementary fluid fed into the gas flow passage; and
   valve actuating means for alternately opening and closing said valve and for mechanically changing the opening speed and the closing speed of said valve in response to said rich and said lean signals so that one of said opening and closing speeds in rapidly and gradually changed, while the other of said opening and closing speeds is slowly and gradually changed during the opening and closing operation so as to make the mean value of the total air-fuel ratio precisely equal to a predetermined air-fuel ratio,
   said valve actuating means comprises a vacuum chamber, a vacuum control device for controlling the vacuum level in said vacuum chamber in response to said rich and said lean signals, and a valve actuating device for actuating said valve in response to change in the vacuum level in said vacuum chamber; and
   said vacuum control device comprises an air port communicating said vacuum chamber with the atmosphere, a vacuum source, a vacuum port communicating said vacuum chamber with said vacuum source, a flapper cooperating with said air and said vacuum ports, a flapper actuating device for gradually opening said air port and gradually closing said vacuum port in accordance with increases in the vacuum level in said vacuum chamber, and a valve device for intermittently establishing the fluid connection between said vacuum port and said vacuum source in response to said rich and said lean signals.

2. An air-fuel ratio controlling device as claimed in claim 1, wherein said vacuum source is vacuum in the intake passage.

3. An air-fuel ratio controlling device as claimed in claim 1, wherein said flapper actuating device comprises a diaphragm connected to said flapper and separating said vacuum chamber from the atmosphere.

4. An air-fuel ratio controlling device as claimed in claim 1, wherein said valve device is an electromagnetic valve for establishing the fluid connection between said vacuum port and said vacuum source in response to the signals of said $\lambda$ sensor.

5. An air-fuel ratio controlling device as claimed in claim 1, wherein said valve actuating means further comprises a supplementary fluid chamber and said valve actuating device comprises a diaphragm connected to said valve and separating said vacuum chamber from said supplementary fluid chamber.

6. An air-fuel ratio controlling device as claimed in claim 5, wherein a partition is disposed in said supplementary fluid chamber for forming an atmospheric pressure chamber between said partition and said diaphragm.

7. An air-fuel ratio controlling device as claimed in claim 1, wherein said valve actuating means further comprises a supplementary fluid chamber and said valve actuating device comprises a bellows connected to said valve and separating said vacuum chamber from said supplementary fluid chamber.

8. An air-fuel ratio controlling device as claimed in claim 1, wherein the opening speed of said valve is different from the closing speed of said valve so that the speed of increase in the amount of the supplementary fluid passing through said valve is caused to be different from the speed of reduction in the amount of the supplementary fluid.

9. An air-fuel ratio controlling device as claimed in claim 1, wherein said supplementary fluid is a supplementary fuel, said valve means being disposed in a supplementary fuel feed passage communicating a supplementary fuel source with said gas flow passage.

10. An air-fuel ratio controlling device as claimed in claim 9, wherein the delay time in generation of said rich signal is less than that of said lean signal, the speed of increase in the amount of the supplementary fuel fed into the gas flow passage being higher than that of reduction in the amount of the supplementary fuel.

11. An air-fuel ratio controlling device as claimed in claim 10, wherein said supplementary fuel source is a liquefied petroleum gas regulator.

12. An air-fuel ratio controlling device as claimed in claim 10, wherein said supplementary fuel feed passage is connected to the intake passage.

13. An air-fuel ratio controlling device as claimed in claim 1, wherein said engine further comprises a carburetor having an air bleed passage and said supplementary fluid is air, said valve means deing disposed in an air passage communicating the atmosphere with said air bleed passage.

14. An air-fuel ratio controlling device as claimed in claim 13, wherein the delay time in generation of said rich signal is less than that of said lean signal, the speed of increase in the amount of the air fed into said air bleed passage being lower than that of reduction in the amount of the air.

15. An air-fuel ratio controlling device as claimed in claim 13, wherein said valve means comprises a first valve and a second valve, said air bleed passage comprising a first passage connected to a main nozzle of said carburetor, and a second passage connected to a slow fuel port of said carburetor, said first passage being connected to said first valve, while said second passage is connected to said second valve.

16. An air-fuel ratio controlling device as claimed in claim 1, wherein said supplementary fluid is supplementary air, said valve means being disposed in an air passage communicating an air source with the exhaust passage located upstream of said λ sensor.

17. An air-fuel ratio controlling device as claimed in claim 16, wherein the delay time in the generation of said rich signal is less than that of said lean signal, the speed of increase in the amount of the air fed into the exhaust passage is lower than that of reduction in the amount of the air.

18. An air-fuel ratio controlling device as claimed in claim 16, wherein said air source is an air pump driven by the engine.

19. An air-fuel ratio controlling device as claimed in claim 1, wherein said valve means comprises a diverging nozzle cooperating with said valve.

20. An air-fuel ratio controlling device as claimed in claim 1, wherein said valve means has an opening, said valve having a valve head which cooperates with said opening and having a cross-sectional area gradually increased along an axis of said valve head.

21. An air-fuel ratio controlling device as claimed in claim 1, wherein said λ sensor is an $O_2$ sensor.

22. An air-fuel ratio controlling device as claimed in claim 1, wherein said engine further comprises an exhaust gas purifier disposed in said exhaust passage, the purifying efficiency of the exhaust gas in said purifier being highest when the total air-fuel ratio is equal to said predetermined air-fuel ratio.

23. An air-fuel ratio controlling device as claimed in claim 22, wherein said exhaust gas purifier comprises a three way catalytic converter, said predetermined air-fuel ratio being the stoichiometric air-fuel ratio.

* * * * *